United States Patent
Seidenberg et al.

(10) Patent No.: US 10,181,953 B1
(45) Date of Patent: Jan. 15, 2019

(54) TRUSTED DATA VERIFICATION

(71) Applicant: Amazon Technologies, Inc., Reno, NV (US)

(72) Inventors: Benjamin Elias Seidenberg, Seattle, WA (US); Gregory Branchek Roth, Seattle, WA (US); Benjamin Tillman Farley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/027,843

(22) Filed: Sep. 16, 2013

(51) Int. Cl.
 *H04L 9/08* (2006.01)
 *H04L 9/32* (2006.01)

(52) U.S. Cl.
 CPC ............ *H04L 9/3247* (2013.01); *H04L 9/088* (2013.01); *H04L 9/0861* (2013.01)

(58) Field of Classification Search
 CPC ............ G06F 19/322; G06F 17/30011; G06F 17/3028; G06F 21/60; H04L 9/3247
 USPC ...................................................... 713/168
 See application file for complete search history.

(56) References Cited

U.S. PATENT DOCUMENTS

| | | | |
|---|---|---|---|
| 5,179,591 A | 1/1993 | Hardy et al. | |
| 5,200,999 A | 4/1993 | Matyas et al. | |
| 5,497,421 A | 3/1996 | Kaufman et al. | |
| 6,084,969 A | 7/2000 | Wright et al. | |
| 6,097,817 A | 8/2000 | Bilgic et al. | |
| 6,185,316 B1 | 2/2001 | Buffam | |
| 6,453,416 B1 | 9/2002 | Epstein | |
| 6,826,686 B1 | 11/2004 | Peyravian et al. | |
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 | 3/2006 | Matyas et al. | |
| 7,073,195 B2 | 4/2006 | Brickell et al. | |
| 7,139,917 B2 | 11/2006 | Jablon | |
| 7,228,417 B2 | 6/2007 | Roskind | |
| 7,320,076 B2 | 1/2008 | Caronni | |
| 7,512,965 B1 | 3/2009 | Amdur et al. | |

(Continued)

FOREIGN PATENT DOCUMENTS

| WO | WO2006077822 | 7/2006 |
|---|---|---|
| WO | WO2008024705 | 2/2008 |
| WO | WO2014063661 | 5/2014 |

OTHER PUBLICATIONS

Armstrong, VMMs versus Hypervisors, Bert Armstrong's Virtualization Blog [online], Jul. 2006 [retrieved on Sep. 3, 2015]. Retrieved from the internet<URL: http://blogs.msdn.com/b/virtual_pc_guy/archive/2006/07/10/661958.aspx>.*

(Continued)

*Primary Examiner* — Michael Pyzocha
(74) *Attorney, Agent, or Firm* — Davis Wright Tremaine LLP

(57) ABSTRACT

Electronically signed data is persistently stored in data storage. After the passage of time, the data may be accessed and presented to a trusted entity for verification of the data. The trusted entity may have access to secret information used to sign the data. The trusted entity may use the secret information to verify an electronic signature of the data. One or more actions may be taken based at least in part on a response provided by the verification system.

29 Claims, 11 Drawing Sheets

(56) References Cited

U.S. PATENT DOCUMENTS

| | | | |
|---|---|---|---|
| 7,533,269 B2* | 5/2009 | Kumagai | G06F 21/64 |
| | | | 713/176 |
| 7,571,324 B2* | 8/2009 | Canard | H04L 9/3255 |
| | | | 380/28 |
| 7,685,430 B1 | 3/2010 | Masurkar | |
| 7,721,322 B2 | 5/2010 | Sastry et al. | |
| 7,757,271 B2 | 7/2010 | Amdur et al. | |
| 7,765,584 B2 | 7/2010 | Roskind | |
| 7,836,306 B2 | 11/2010 | Pyle et al. | |
| 7,890,767 B2 | 2/2011 | Smith et al. | |
| 7,913,084 B2 | 3/2011 | Medvinsky et al. | |
| 7,917,764 B2 | 3/2011 | Futa | |
| 8,006,280 B1* | 8/2011 | Hildebrand | G06F 21/6218 |
| | | | 380/277 |
| 8,006,289 B2 | 8/2011 | Hinton et al. | |
| 8,024,562 B2 | 9/2011 | Gentry et al. | |
| 8,041,954 B2 | 10/2011 | Plesman | |
| 8,059,820 B2 | 11/2011 | Malaviarachchi et al. | |
| 8,121,993 B2* | 2/2012 | Blount | G06F 21/32 |
| | | | 707/609 |
| 8,151,116 B2 | 4/2012 | van de Horst et al. | |
| 8,275,356 B2 | 9/2012 | Hickie | |
| 8,325,922 B1* | 12/2012 | Sun | H04W 12/04 |
| | | | 380/258 |
| 8,332,922 B2 | 12/2012 | Dickinson et al. | |
| 8,370,638 B2 | 2/2013 | Duane et al. | |
| 8,386,800 B2 | 2/2013 | Kocher et al. | |
| 8,387,117 B2 | 2/2013 | Eom et al. | |
| 8,418,222 B2 | 4/2013 | Gbadegesin et al. | |
| 8,423,759 B2 | 4/2013 | Moreau | |
| 8,453,198 B2 | 5/2013 | Band et al. | |
| 8,464,058 B1 | 6/2013 | Chen et al. | |
| 8,464,354 B2 | 6/2013 | Teow et al. | |
| 8,533,772 B2 | 9/2013 | Garg et al. | |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,739,308 B1 | 5/2014 | Roth | |
| 8,745,205 B2 | 6/2014 | Anderson et al. | |
| 8,776,190 B1 | 7/2014 | Cavage et al. | |
| 8,776,204 B2 | 7/2014 | Faynberg et al. | |
| 8,868,923 B1 | 10/2014 | Hamlet et al. | |
| 8,892,865 B1 | 11/2014 | Roth | |
| 9,112,910 B2* | 8/2015 | Pavlovski | H04L 63/18 |
| 2001/0008013 A1 | 7/2001 | Johnson et al. | |
| 2001/0018739 A1 | 8/2001 | Anderson et al. | |
| 2002/0016840 A1 | 2/2002 | Herzog et al. | |
| 2002/0067832 A1 | 6/2002 | Jablon | |
| 2002/0112181 A1 | 8/2002 | Smith | |
| 2002/0143711 A1* | 10/2002 | Nassiri | G06Q 20/3821 |
| | | | 705/76 |
| 2002/0161723 A1 | 10/2002 | Asokan et al. | |
| 2002/0161998 A1 | 10/2002 | Cromer et al. | |
| 2002/0162019 A1 | 10/2002 | Berry et al. | |
| 2002/0194483 A1 | 12/2002 | Wenocur et al. | |
| 2002/0198848 A1 | 12/2002 | Michener | |
| 2003/0016826 A1 | 1/2003 | Asano et al. | |
| 2003/0041110 A1 | 2/2003 | Wenocur et al. | |
| 2003/0093678 A1* | 5/2003 | Bowe | H04L 9/3236 |
| | | | 713/180 |
| 2003/0135740 A1 | 7/2003 | Talmor et al. | |
| 2003/0145197 A1 | 7/2003 | Lee et al. | |
| 2003/0149781 A1 | 8/2003 | Yared et al. | |
| 2003/0188117 A1 | 10/2003 | Yoshino et al. | |
| 2004/0088260 A1 | 5/2004 | Foster et al. | |
| 2004/0103096 A1 | 5/2004 | Larsen | |
| 2004/0128505 A1 | 7/2004 | Larsen | |
| 2004/0128510 A1 | 7/2004 | Larsen | |
| 2004/0131185 A1 | 7/2004 | Kakumer | |
| 2004/0143733 A1 | 7/2004 | Ophir et al. | |
| 2004/0158734 A1 | 8/2004 | Larsen | |
| 2004/0172535 A1 | 9/2004 | Jakobsson et al. | |
| 2005/0036611 A1 | 2/2005 | Seaton et al. | |
| 2005/0043999 A1 | 2/2005 | Ji et al. | |
| 2005/0060580 A1 | 3/2005 | Chebolu et al. | |
| 2005/0080914 A1 | 4/2005 | Lerner et al. | |
| 2005/0132192 A1 | 6/2005 | Jeffries et al. | |
| 2005/0132201 A1* | 6/2005 | Pitman | G06F 21/645 |
| | | | 713/176 |
| 2005/0132215 A1 | 6/2005 | Wang et al. | |
| 2005/0166263 A1 | 7/2005 | Nanopoulos et al. | |
| 2005/0235148 A1 | 10/2005 | Scheidt et al. | |
| 2005/0273862 A1 | 12/2005 | Benaloh et al. | |
| 2005/0278547 A1 | 12/2005 | Hyndman et al. | |
| 2006/0070116 A1 | 3/2006 | Park | |
| 2006/0075462 A1 | 4/2006 | Golan et al. | |
| 2006/0094406 A1 | 5/2006 | Cortegiano | |
| 2006/0094410 A1 | 5/2006 | Cortegiano | |
| 2006/0100928 A1 | 5/2006 | Waleczak, Jr. et al. | |
| 2006/0130100 A1 | 6/2006 | Pentland | |
| 2006/0149677 A1 | 7/2006 | Shahine et al. | |
| 2006/0174125 A1 | 8/2006 | Brookner | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0218625 A1 | 9/2006 | Pearson et al. | |
| 2006/0230284 A1 | 10/2006 | Fiske | |
| 2006/0256961 A1 | 11/2006 | Brainard et al. | |
| 2006/0271785 A1 | 11/2006 | Holtmanns et al. | |
| 2006/0282878 A1 | 12/2006 | Stanley et al. | |
| 2007/0005955 A1 | 1/2007 | Pyle et al. | |
| 2007/0033396 A1 | 2/2007 | Zhang et al. | |
| 2007/0037552 A1 | 2/2007 | Lee et al. | |
| 2007/0043949 A1* | 2/2007 | Bugbee | H04L 9/3247 |
| | | | 713/176 |
| 2007/0061571 A1 | 3/2007 | Hammes et al. | |
| 2007/0061885 A1 | 3/2007 | Hammes et al. | |
| 2007/0136361 A1 | 6/2007 | Lee et al. | |
| 2007/0157309 A1 | 7/2007 | Bin et al. | |
| 2007/0174614 A1 | 7/2007 | Duane et al. | |
| 2007/0186102 A1 | 8/2007 | Ng | |
| 2007/0234410 A1 | 10/2007 | Geller | |
| 2007/0250706 A1 | 10/2007 | Oba | |
| 2007/0277231 A1 | 11/2007 | Medvinsky et al. | |
| 2008/0010665 A1 | 1/2008 | Hinton et al. | |
| 2008/0040773 A1 | 2/2008 | AlBadarin et al. | |
| 2008/0066150 A1 | 3/2008 | Lim | |
| 2008/0080718 A1 | 4/2008 | Meijer et al. | |
| 2008/0083036 A1 | 4/2008 | Ozzie et al. | |
| 2008/0148054 A1* | 6/2008 | Cahill | G06F 21/64 |
| | | | 713/176 |
| 2008/0163337 A1 | 7/2008 | Tuliani et al. | |
| 2008/0168530 A1 | 7/2008 | Kuehr-Mclaren et al. | |
| 2008/0182592 A1 | 7/2008 | Cha et al. | |
| 2008/0222694 A1 | 9/2008 | Nakae | |
| 2008/0301444 A1 | 12/2008 | Kim et al. | |
| 2008/0301630 A1 | 12/2008 | Arnold et al. | |
| 2008/0313719 A1 | 12/2008 | Kaliski, Jr. et al. | |
| 2009/0013402 A1 | 1/2009 | Plesman | |
| 2009/0019134 A1 | 1/2009 | Bellifemine et al. | |
| 2009/0049518 A1 | 2/2009 | Roman et al. | |
| 2009/0172793 A1 | 7/2009 | Newstadt et al. | |
| 2009/0210712 A1 | 8/2009 | Fort | |
| 2009/0217385 A1 | 8/2009 | Teow et al. | |
| 2009/0254572 A1* | 10/2009 | Redlich | G06Q 10/06 |
| 2009/0320093 A1 | 12/2009 | Glazier et al. | |
| 2010/0017603 A1 | 1/2010 | Jones | |
| 2010/0037304 A1 | 2/2010 | Canning et al. | |
| 2010/0058060 A1 | 3/2010 | Schneider | |
| 2010/0058072 A1 | 3/2010 | Teow et al. | |
| 2010/0071056 A1 | 3/2010 | Cheng | |
| 2010/0083001 A1 | 4/2010 | Shah et al. | |
| 2010/0111296 A1 | 5/2010 | Brown et al. | |
| 2010/0125894 A1 | 5/2010 | Yasrebi et al. | |
| 2010/0131756 A1 | 5/2010 | Schneider | |
| 2010/0142704 A1 | 6/2010 | Camenisch et al. | |
| 2010/0205649 A1 | 8/2010 | Becker et al. | |
| 2010/0239095 A1 | 9/2010 | Carter et al. | |
| 2010/0251347 A1 | 9/2010 | Roskind | |
| 2010/0269156 A1 | 10/2010 | Hohlfeld et al. | |

(56) References Cited

U.S. PATENT DOCUMENTS

| | | | |
|---|---|---|---|
| 2010/0281267 A1* | 11/2010 | Sakumoto | G06F 21/64 713/180 |
| 2010/0290476 A1 | 11/2010 | Brindle et al. | |
| 2010/0332845 A1 | 12/2010 | Asaka | |
| 2011/0004753 A1 | 1/2011 | Gomi et al. | |
| 2011/0010538 A1 | 1/2011 | Falk | |
| 2011/0035593 A1 | 2/2011 | Pyle et al. | |
| 2011/0055562 A1 | 3/2011 | Adelman et al. | |
| 2011/0055585 A1 | 3/2011 | Lee | |
| 2011/0078107 A1 | 3/2011 | Almeida et al. | |
| 2011/0083015 A1 | 4/2011 | Meier | |
| 2011/0099362 A1 | 4/2011 | Haga et al. | |
| 2011/0131415 A1 | 6/2011 | Schneider | |
| 2011/0138192 A1 | 6/2011 | Kocher et al. | |
| 2011/0167479 A1 | 7/2011 | Maes | |
| 2011/0179469 A1 | 7/2011 | Blinn et al. | |
| 2011/0231940 A1 | 9/2011 | Perumal et al. | |
| 2011/0239283 A1 | 9/2011 | Chern | |
| 2011/0252229 A1 | 10/2011 | Belenkiy et al. | |
| 2011/0265172 A1 | 10/2011 | Sharma et al. | |
| 2011/0296497 A1 | 12/2011 | Becker | |
| 2011/0311055 A1 | 12/2011 | Parann-Nissany | |
| 2011/0320606 A1 | 12/2011 | Madduri et al. | |
| 2012/0017095 A1 | 1/2012 | Blenkhorn et al. | |
| 2012/0020474 A1 | 1/2012 | Kudoh et al. | |
| 2012/0023334 A1 | 1/2012 | Brickell et al. | |
| 2012/0036551 A1 | 2/2012 | Le Saint et al. | |
| 2012/0054625 A1 | 3/2012 | Pugh et al. | |
| 2012/0060035 A1* | 3/2012 | Kalmady | G06F 21/6209 713/176 |
| 2012/0106735 A1 | 5/2012 | Fukuda | |
| 2012/0110636 A1 | 5/2012 | Van Biljon et al. | |
| 2012/0144034 A1 | 6/2012 | McCarty | |
| 2012/0159577 A1 | 6/2012 | Belinkiy et al. | |
| 2012/0166818 A1* | 6/2012 | Orsini | H04L 9/085 713/193 |
| 2012/0233216 A1 | 9/2012 | Lim | |
| 2012/0243687 A1 | 9/2012 | Li | |
| 2012/0245978 A1 | 9/2012 | Jain | |
| 2012/0265690 A1 | 10/2012 | Bishop et al. | |
| 2012/0317414 A1 | 12/2012 | Glover | |
| 2013/0031255 A1 | 1/2013 | Maloy et al. | |
| 2013/0086662 A1* | 4/2013 | Roth | G06F 21/31 726/7 |
| 2013/0086663 A1 | 4/2013 | Roth et al. | |
| 2013/0111217 A1 | 5/2013 | Kopasz et al. | |
| 2013/0132232 A1 | 5/2013 | Pestoni et al. | |
| 2013/0145447 A1 | 6/2013 | Maron | |
| 2013/0166918 A1 | 6/2013 | Shahbazi et al. | |
| 2013/0191884 A1 | 7/2013 | Leicher et al. | |
| 2013/0198519 A1 | 8/2013 | Marien | |
| 2013/0254536 A1 | 9/2013 | Glover | |
| 2013/0254541 A1* | 9/2013 | Yamanaka | H04L 9/0866 713/168 |
| 2013/0282461 A1 | 10/2013 | Ovick et al. | |
| 2013/0318630 A1* | 11/2013 | Lam | G06F 21/60 726/28 |
| 2014/0013409 A1 | 1/2014 | Halageri | |
| 2014/0019766 A1* | 1/2014 | Takahashi | H04L 9/3231 713/176 |
| 2014/0082715 A1 | 3/2014 | Grajek et al. | |
| 2014/0122866 A1 | 5/2014 | Haeger et al. | |
| 2014/0181925 A1 | 6/2014 | Smith | |
| 2014/0208408 A1 | 7/2014 | Bilgen et al. | |
| 2014/0281477 A1 | 9/2014 | Nayshtut et al. | |
| 2014/0281487 A1 | 9/2014 | Klausen et al. | |
| 2015/0082039 A1 | 3/2015 | Stalzer et al. | |
| 2015/0089614 A1 | 3/2015 | Mathew et al. | |
| 2015/0208245 A1* | 7/2015 | Robinton | H04L 9/3247 455/411 |

OTHER PUBLICATIONS

Amazon, "Amazon Prime Video—security considerations," Amazon. com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014 in International Patent Application No. PCT/US2014/057043, filed Sep. 23, 2014.

International Search Report and Written Opinion dated Dec. 30, 2014 in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 retrieved Jun. 27, 2012, from http://web.mit.edu/kerberos/krb5-1.10/krb5-1.10.2/doc/krb5-admin.html, 57 pages.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US/058083 dated Dec. 27, 2012.

Roth et al.,"Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from Internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/ Physical_unclonable_function, 8 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

* cited by examiner

TRUSTED DATA VERIFICATION

BACKGROUND

The integrity of data is important in many contexts. The lifecycle of a unit of information (e.g., a file) can involve various events, many of which have the potential to change the data, even if only slightly. Information may, for example, be stored, read, rewritten to one or more new locations, transmitted over a network and/or otherwise processed in a manner that has the potential to introduce errors into the data. In addition, despite best efforts, systems are sometimes compromised. Unauthorized access to a system may provide the opportunity to affect data, whether intentionally or inadvertently. Further, in many contexts, it is often desirable to store data in one or more systems outside of one's control. Various companies may, for instance, provide various data storage services of varying degrees of complexity. A company may, for instance provide a database service that others may utilize for various reasons, such as avoiding capital expenditures and/or the complexity of operating suitable systems on their own. At least in part due to the complexities of the systems involved in storing and otherwise processing data, maintaining data integrity can be a rather difficult task, especially when the systems are operated outside of one's control.

BRIEF DESCRIPTION OF THE DRAWINGS

Various embodiments in accordance with the present disclosure will be described with reference to the drawings, in which.

DETAILED DESCRIPTION

Figure 1:
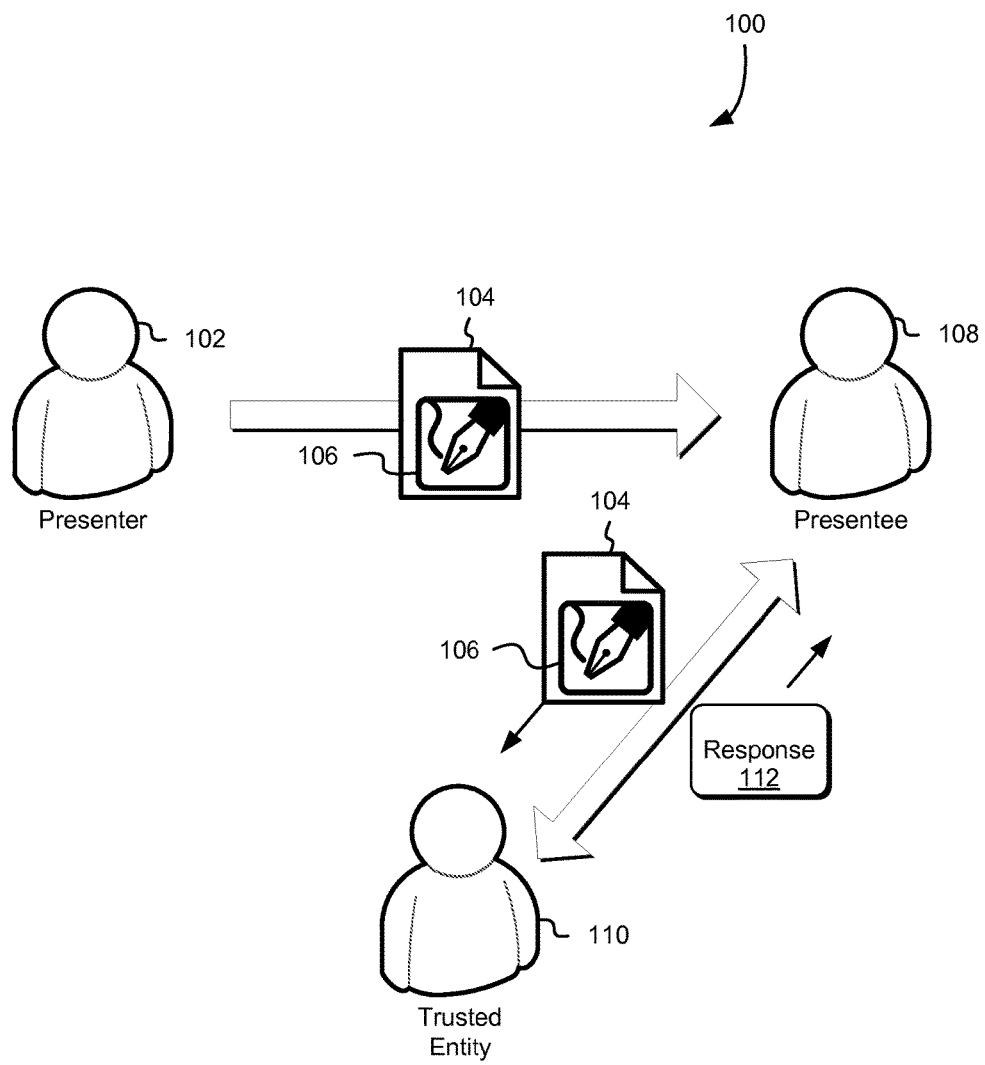
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to techniques for verifying persistently stored data. In an embodiment, the verification of data includes a presenter, presentee, and a trusted entity, each being implemented as a separate computer system or component thereof, such as a programming module or hardware module as discussed in more detail below. The presenter obtains data and generates a signature based at least in part on the data and secret information (a shared secret) shared between the presenter and the trusted entity. The presenter causes the data and signature and possibly additional metadata (collectively "signed data") to be stored persistently in a data storage system, which may be a local storage device, a data storage system accessible over a network or otherwise. At a later time, the presenter or another entity may obtain the signed data and present the signed data to the presentee.

The presentee may operate in accordance with programming logic that is dependent on the validity of the data presented to it. However, the presentee may be unable to verify the data itself due to, for instance, a lack of access to the shared secret at the time of verification. To verify the data, the presentee may present the signed data to the trusted entity (verification system) which may have access to the shared secret at the time of verification (but not necessarily at the time of signature generation, in all embodiments). The trusted entity may use the shared secret to verify whether the data is valid, e.g., by using the shared secret and data to generate a reference signature which is compared to a signature from the provided signed data. The trusted entity may perform other operations, such as determining whether policy allows verification of the data and other operations.

Upon performing any applicable operations, the trusted entity may provide a response to the verification request. The response to the verification request may include information about whether the verification request was processed, any results of processing (e.g., whether the signature is deemed by the trusted entity as authentic), any reasons for denial of the request (e.g., identification of one or more policy violations) and/or other relevant information. The presentee or another system may use the response to the verification request to perform one or more operations in accordance with the response. For example, performance of some operations may require a response from the trusted entity that the data is valid. The operations following receipt of the response to the verification request may, therefore, vary in accordance with the information provided in the response to the verification request.

Numerous variations of the above are considered as being within the scope of the present disclosure. For example, in some embodiments, the presenter and presentee are implemented on different computing devices while in other embodiments, the presenter and presentee are implemented on the same computing device and may be the same entity (e.g., on the same virtual and/or physical computer system). The presentee and the trusted entity may also be implemented on the same computing device (e.g., server computer system). In addition, the presenter, presentee and trusted entity may be implemented on the same computing device. In some embodiments, the trusted entity is implemented by a service provider (such as a computing resource service provider). Presenters and/or presentees may be customers of the service provider and, in some instances, the trusted entity may be configured to receive different requests to verify the same signature from different customers of the service provider. Depending on various contextual factors (e.g., identities of requestors), the trusted entity may provide different attestations as to the validity of the electronic signature. Further, the service provider may include a system configured to provide an application programming interface for receiving application programming interface requests to configure parameters for responding to requests to verify electronic signatures, where the parameters may be determinative of what type of response and/or how much information is included in a response to a particular requestor.

In some embodiments, the secret shared between the trusted entity and the entity that generates or causes to have generated an electronic signature is derived from another, master secret. The master secret may be usable for a set of uses (e.g., for access to various computing resources, to cause certain operations to occur and the like). The shared secret may be derived from the master secret in a way that limits the uses to a proper subset of the set of uses for which the master key is usable. The master secret may be held secretly by one entity so as to prevent access to the master secret from other entities, which may include the trusted entity. In some embodiments, the shared secret is derived by inputting the master secret and information corresponding to one or more limitations (perhaps iteratively) into a one way function. The output of the one way function may be used as the shared secret or the shared secret may be based at least in part of the one way function. In this manner, the trusted secret is usable for only a limited set of uses that is smaller than the set of uses for which the master key is usable. In this manner, the holder of the master key can delegate a limited amount of authority to a trusted entity. Such techniques may be used for various purposes, such as limiting when and/or by whom data is verifiable.

Some embodiments include those in which shared secrets are held as secrets for an amount of time and then published. For example, a trusted entity may obtain (e.g., receive or generate) a cryptographic key. The trusted entity may securely store the obtained key for an amount of time, perhaps using the obtained key to verify data if so requested during the amount of time. At some point, which may be a predetermined amount of time or based at least in part on a triggering event (e.g., a request from an entity that also holds the key), the trusted entity or another entity (e.g., another entity with access to the key) may make the key publicly available, such as by publishing the key to a publicly-available website. In this manner, the key is usable by the trusted entity for an amount of time to verify data. Once the key has been published, the key becomes effectively useless for verification since anyone with access to the key (i.e., any entity with access to the source by which the key was published) can have forged an electronic signature using a published copy of the key. As a specific example, such techniques are usable with an electronic mail or other messaging system. Electronic messages (e.g., emails) can be signed using a secret with which a trusted entity has access. The authenticity of the messages (which may include header information with various metadata, including an address and/or other identity of a sender) may be verified for a period of time. Once the secret has been published, the authenticity of the message is not verifiable using the secret since anyone with access to the public secret can forge the signature of the message using the publicly-available secret.

FIG. 1 shows an illustrative example of an environment 100 in which various embodiments of the present disclosure may be practiced. As illustrated in FIG. 1 a presenter 102 provides data 104 and an electronic signature 106 of the data to a presentee 108. The presentee 108 may provide the data 104 and the electronic signature 106 to a trusted entity 110 for verification. The trusted entity 110 may provide a response 112 to the presentee 108. In this manner the presentee 108 is able to verify the integrity of the data 104 by means of verification by the trusted entity 110 of the electronic signature 106.

As will be discussed in more detail below, numerous embodiments are considered as being within the scope of the present disclosure. For example, in some embodiments, the presenter 102, presentee 108 and trusted entity 110 are different logical entities. The presenter 102 and the presentee 108 may, for example, be implemented as separate computer systems and data may be transferred between the presenter 102 and the presentee 108 by way of a suitable computer network or combination of networks, such as the Internet and intranet and/or other networks described below. Similarly, the trusted entity 110 may be implemented as a computer system separate from the presenter 102 and the presentee 108. Data transfer between the trusted entity 110 and the presentee 108 and data transfer between the trusted entity 110 and the presenter 102 may occur over one or more networks, such as noted. In other embodiments however, various entities in FIG. 1 may be implemented together on a single computing device. For example, in an embodiment the presenter 102 and presentee 108 are implemented as separate processes on the same computing device. Similarly, the trusted entity 110 and the presentee 108 may be implemented as separate processes on the same computing device. Generally a presenter 102, presentee 108 and/or trusted entity 110 may be implemented in various ways such as hardware, as one or more processes executing on hardware and/or otherwise.

Figure 2:
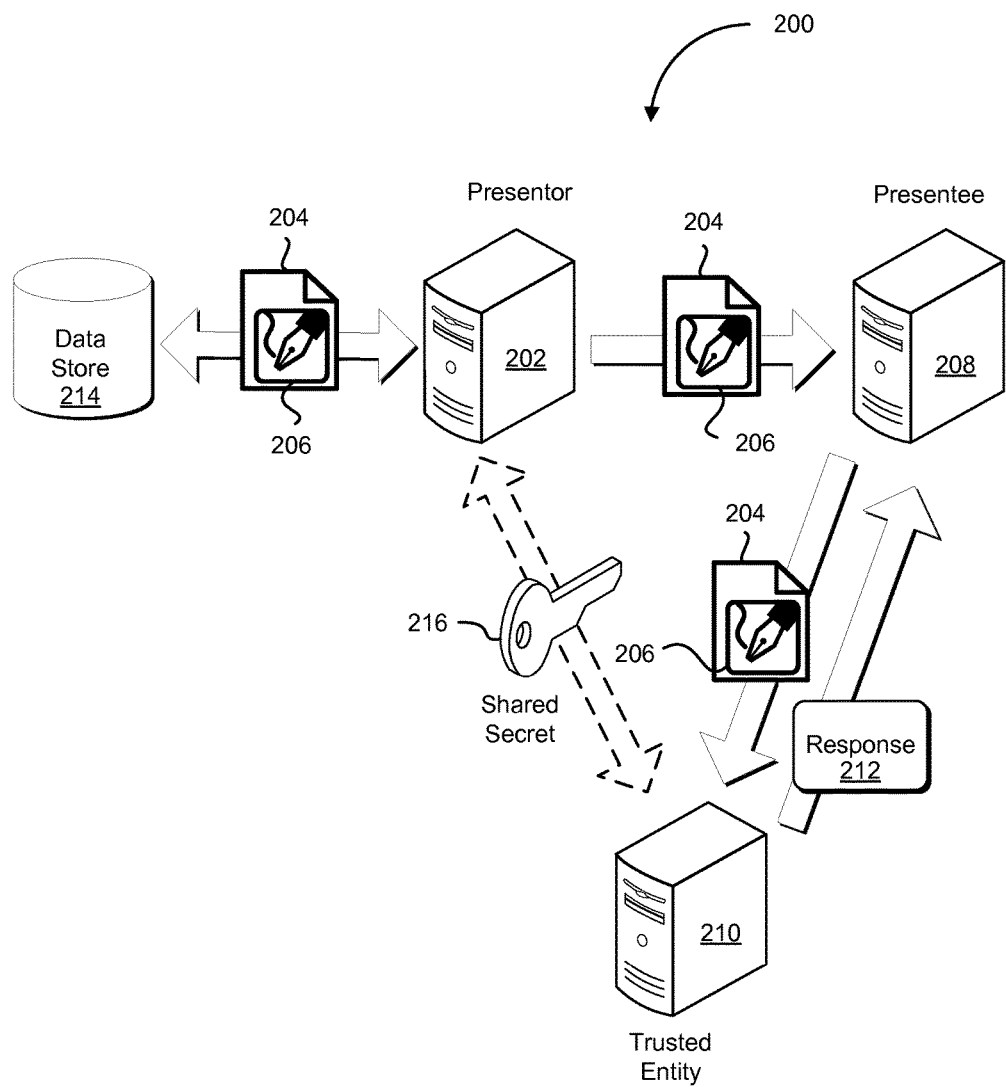
FIG. 2 shows an illustrative example of an environment in which various embodiments may be practiced.

FIG. 2 shows an illustrative example of an environment 200 in which various embodiments may be practiced. Similar to the environment 100 described above in connection with FIG. 1, the environment 200 in FIG. 2 includes a presenter 202 which provides data 204 and a signature 206 of the data 204 to a presentee 208. The presentee 208 may then provide the data 204 and the signature 206 of the data to a trusted entity 210 for verification. As with the environment discussed above in connection with FIG. 1, providing the data (and, generally, providing data) may be performed by the transmission of appropriately formatted signals in accordance with a communications protocol utilized by the transmitter and the receiver (e.g., the presentee and the trusted entity, respectively). In some embodiments, for example, a communication between the presentee 208 and the trusted entity 210 encodes a verification request serving as an instruction to the trusted entity 210 to verify the signature. The request may include the signature, data used to generate the signature and other data, such as metadata for the request usable by the trusted entity 210 to determine if and how to process the request. As one example, the verification request itself may require a signature of the request generated by presentee 208 to enable the trusted entity 210 to determine whether the submitter of the request is authorized to transmit the request. As another example, various data may be used for evaluation of policy by the trusted entity 210. The policy (i.e., a set of one or more policies' may be based at least in part on an identity of the presentee 208, an identity of the presenter 202 and/or any context in which the verification request was presented. Upon receipt of the electronic signature, the trusted entity 210 may verify the signature 206 and provide a response 212 to the presentee 208, such as described in more detail below.

When the presenter 202 provides the data 204 and the signature 206 of the data 204 to the presentee 208, the presenter 202 may obtain the data 204 and the signature 206 from a data store 214 in which the data 204 and in which the signature 206 have been persistently stored. The data store 214 may be a data storage device such as a hard drive accessible to the presenter 202. As one example, the data store 214 may be a data storage device locally attached to a computer system in which the presenter 202 is implemented. As another example, the data store 214 may be accessible to the presenter 202 over a network, such as network attached storage or a data storage system provided as a service by a computing resource service provider. In some embodiments, the data store is a component of a database (e.g., relational database, NoSQL database, and/or any system configured to store data in a structured manner) and obtaining data from the data store may include querying the database. Generally the data store 214 may be any data storage system accessible by the presenter 202. The data 204 and signature for the data 206 may have been provided to the data store 214 by the presenter 202 or another system which had generated or otherwise had accessible the signature 206 of the data 204.

To enable the trusted entity 210 to verify the signature 206 of the data 204, the presenter 202 and the trusted entity 210 may share a shared secret 216. The shared secret 216 may be, for example, a cryptographic key used in one or more symmetric authentication schemes. A symmetric authentication scheme may be a scheme in which an entity that verifies the authenticity of a message by way of an electronic signature of the message does so using the same information that was used to generate the electronic signature. Such information may be held secretly between the authenticating entity and the verifying entity and, perhaps, one or more other trusted entities. Further, a symmetric authentication scheme may utilize one or more symmetric cryptographic primitives. Example shared secrets include keys usable with one or more symmetric cryptographic primitives (cryptographic algorithms), such as keys usable to generate message authentication codes (MACs), such as hash-based message authentication codes (HMACs) or cipher block chaining MACs (CBC-MACs). Generally, the use of one-way functions, including hash functions and key derivation functions (such as Bcrypt and password-based key derivation function two (PBKDF2)) that take the shared secret and data as inputs are considered as being within the scope of the present disclosure. In this manner, the presenter 202 is able to generate the signature 206 based at least in part on the data 204 while providing the trusted entity 210 the ability to use the shared secret 216 to verify the signature 206 of the data 204.

It should be noted that as with all embodiments described herein, numerous variations are considered as being within the scope of the present disclosure. For example, in some embodiments, the presenter signs the data 204 using the shared secret 216 to generate the electronic signature 206. In other embodiments, however, the presenter 202 may provide the data 204 to the trusted entity 210 for generation of the electronic signature 206. In such embodiments, the trusted entity 210 may use a secret that the presenter does or does not have access to. The shared secret may be used by the trusted entity 210 to verify the identity of the presenter (e.g., by verifying a signature of a request to sign the data) and, therefore, that it is able to generate the signature. Embodiments within those of the present disclosure, however, include those where there is not necessarily a shared secret but, for instance, the presenter 202 proves identity to the trusted entity 210 using an asymmetric signature scheme or other trust mechanism, such as an IP address.

Figure 3:
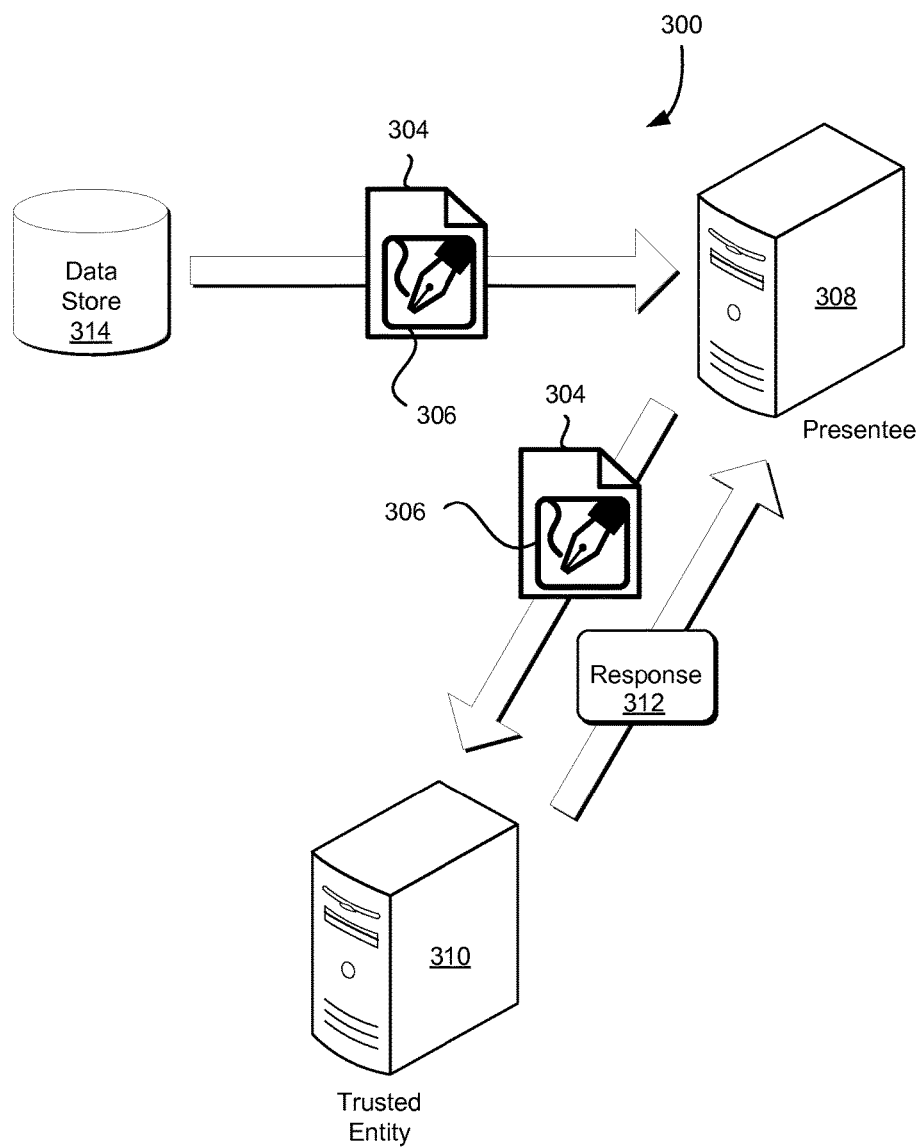
FIG. 3 shows an illustrative example of an environment in which various embodiments may be practiced.

FIG. 3 shows another illustrative example of a variation of the environment illustrated in FIG. 2 which is considered as being within the scope of the present disclosure. As illustrated in FIG. 3, data 304 and an electronic signature 306 of the data is provided to a presentee 308. The presentee 308, as described above, may be a computer system or component thereof such as a process operating thereon configured to provide the data 304 and the electronic signature 306 to a trusted entity 310 for verification. The trusted entity 310 may similarly be a computer system or component thereof configured to provide a response 312 to the presentee 308 regarding the authenticity of the electronic signature 306 of the data 304. In the example environment 300, the data 304 and electronic signature 306 are provided to the presentee 308 from a data store 314. In other words, with reference to terminology used in connection with FIG. 2, the data store 314 may be considered a presenter as described above or that the presenter and presentee as described above are the same entity 308.

As illustrated in FIG. 3, the presentee 308 obtains the data and the electronic signature 306 of the data 304 from the data store 314 and communicates with the trustee entity 310 to verify the electronic signature 306. To enable the trusted entity 310 to verify the electronic signature 306 of the data 304, the trusted entity 310 may have access to a secret shared between the trusted entity 310 and an entity (e.g., computer system) that generated the electronic signature 306. For example, as illustrated in FIG. 3, the presentee 308 may have used the shared secret to generate the electronic signature 306 and store the electronic signature 306 and data 304 in the data store 314. Another entity having access to a secret shared with the trusted entity 310 may have also caused the electronic signature 306 and data 304 to be stored in the data store 314, which is then later accessed by the presentee 308 and presented to the trusted entity 310 for verification.

Figure 4:
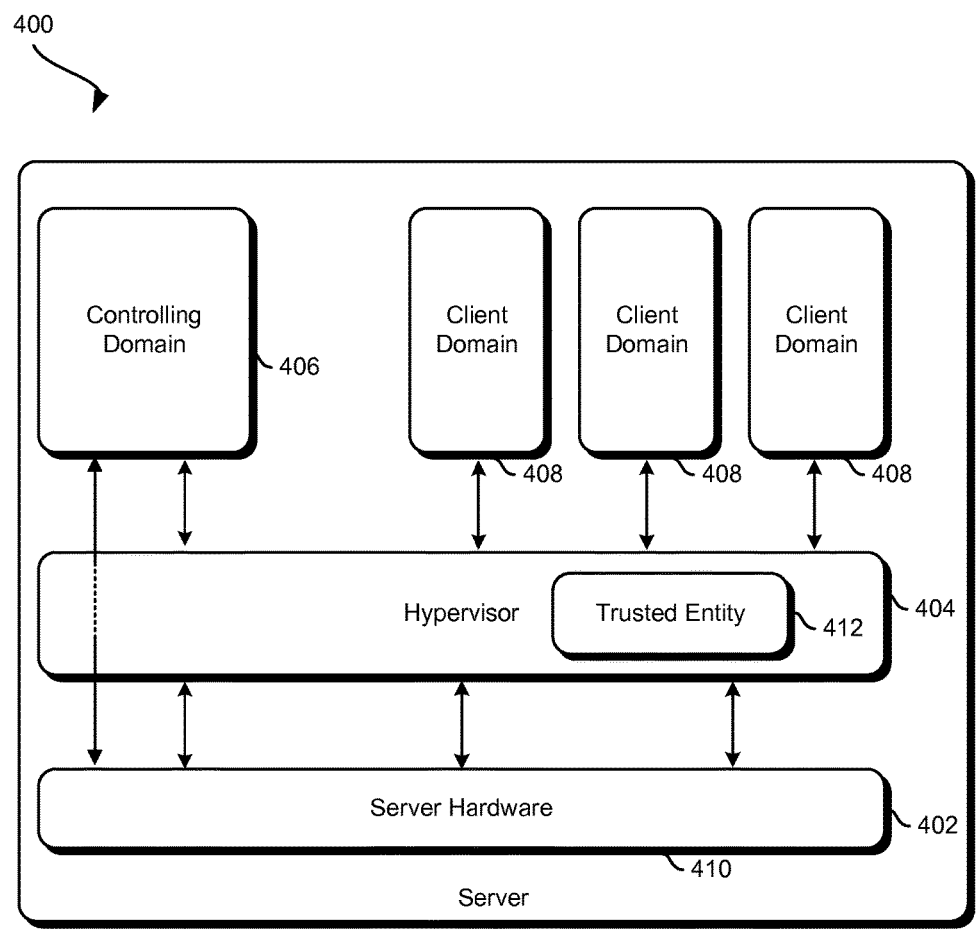
FIG. 4 shows an illustrative example of a representation of a server computer system in accordance with at least one embodiment.

In various embodiments, server hardware may be used to implement a trusted entity and presentee and possibly a presenter. Part of such implementation may utilize abstracting the server hardware using a variety of virtualization techniques operate a plurality of guest computer systems running virtual operating system instances simultaneously. FIG. 4, accordingly illustrates an environment 400 using one such technique. In some embodiments, the server hardware 402 of the server may interface with a virtual machine monitor (VMM) or hypervisor 404 running directly on the hardware as a native hypervisor. This Type 1, native or bare metal hypervisor runs directly on the server hardware. Examples of Type 1 hypervisors include Xen®, Hyper-V®, various products from VMWare® and others. In other embodiments, the server hardware may interface with a VMM or hypervisor that runs as a client of the host operating system (OS). Examples of Type 2, or hosted, hypervisors include VMWare® Workstation, VirtualBox® and others. Bare metal hypervisors typically run at the highest privileged processor state and hosted hypervisors typically run at the highest privileged user processor state in order to efficiently provide memory management services, access to system resources, and processor scheduling for dependent domains. As illustrated in FIG. 4, the hypervisor 404 may include a process that operates as a trusted entity 412. The process may, for instance, have access to a shared secret (either locally stored on the server hardware 402) or otherwise have access to cause a different computer system (or entity on the server 400) to use a shared secret, such as described above. In some embodiments, the trusted entity 412 operates as an abstraction of a cryptographic hardware module to enable client domains 408 to make calls to the trusted entity 412 as if to a hardware component. The trusted entity 412 may be a programmatic implementation of a cryptographic module or may serve as an abstraction layer of an actual cryptographic hardware module of the server hardware 402. In an embodiment, the hypervisor implements a virtual network and the trusted entity (or, generally, a verification system) is implemented in a virtual machine running on said hypervisor. In some embodiments, however, the trusted entity is implemented as an actual hardware module, such as a trusted platform module (TPM) included in the server hardware 402.

Of the dependent domains, the most privileged is the controlling domain 406, which may run processes that implement administration operations for controlling and configuring the hypervisor. The controlling domain also may run processes that implement administration operations for controlling and configuring the lesser domains, including the client domains 408 that may, in some embodiments, host guest operating systems and applications that operate as presenters and/or presentees, such as described above. The controlling domain may have direct access to the hardware resources of the server hardware and the controlling domain may provide that access to client domains. In some embodiments, a client domain may have no direct access to the hardware resources or direct access to some hardware resources of the server hardware including, but not limited to, Graphics Processing Units (GPUs) and Network Interface Cards (NICs). Generally, client domains may be provided less direct hardware access than controlling domains.

As illustrated in FIG. 4, one or more client domains 408 may operate as presentees and pass to the hypervisor 404 electronic signatures for verification by the trusted entity 412. The trusted entity may use an appropriate secret to verify electronic signatures and signal the client domains 408 appropriately. Further, one or more client domains 408 may operate as a presenter, presenting an electronic signature to another client domain or, generally, to another entity.

Figure 5:
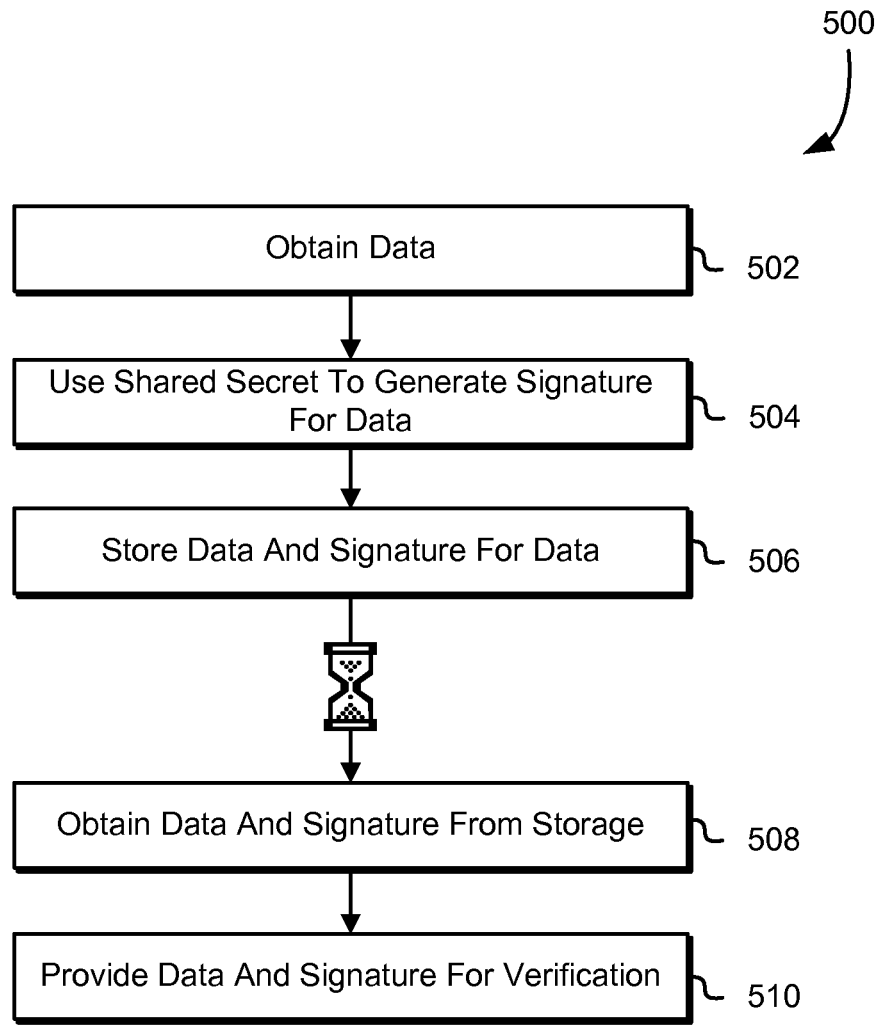
FIG. 5 shows an illustrative example of a process for providing data for verification.

FIG. 5 shows an illustrative example of a process 500 which may be used to provide verifiable data in accordance with various embodiments. The process 500 may be performed by any suitable system or component thereof, such as a presenter described above or generally any system or collection of systems. In an embodiment the process 500 includes obtaining 502 data. The data may be obtained 502 in any suitable manner. For example, the data may be obtained by generating the data or by obtaining the data from another entity such as by receiving the data over a network from another computer system. A secret shared with a trusted entity may be used 504 to generate a signature for the data. As one example, the electronic signature may be generated as a hash based message authentication code (HMAC) using inputs of the data and the shared secret, although other uses of one way functions and combinations of functions are considered as being within the scope of the present disclosure. It should be noted that the signature may be generated in other ways in accordance with various embodiments. For example, other data based at least in part on the data and the shared secret, may be used as inputs to a one-way function such as an HMAC function.

Generally, while electronic signatures of the data are used throughout the present disclosure for the purpose of illustration, the scope of the present disclosure extends to various signatures based at least in part on the data. As one illustrative example, the data or a portion thereof may be input into a one way function (e.g., a hash function) to generate a hash of the data. The signature that is persisted and perhaps eventually presented to a trusted entity may be a signature of the hash of the data, thereby allowing the data to be verified by a trusted entity with just the hash of the data and the signature of the hash without providing the trusted entity access to the data itself. In this example, data may be presented to a presentee that may calculate the hash of the data (without a shared secret or with a secret shared between the presenter and the presentee, if different entities) and present the hash and the signature to the trusted entity for verification. As another example, the data may be encrypted and a signature for the data may be generated using the encrypted data (and a shared secret). The encrypted data and the signature may be provided to the trusted entity for verification. In this manner, the encrypted data may be provided to the trusted entity without providing the data in clear text form. If needed, various embodiments may employ additional operations, such as providing a key used to encrypt the data to a presentee to enable the presentee to verify that the plaintext (cleartext) data matches the encrypted data. In general, various schemes in which different entities are provided access to plaintext data are considered as being within the scope of the present disclosure and the data upon which a signature is generated may not be the plaintext data, but may a hash of the plaintext data, encrypted data, and/or data based at least in part on the plaintext data. In other words, the term "data" and related terms are to be interpreted broadly to encompass embodiments where various transformations on original data are performed before a signature is generated.

Returning to FIG. 5, when the signature is generated 504, the data and the signature for the data may then be persistently stored 506 in a data storage system which, as discussed above, may be a locally attached data storage device or may be a data storage system accessible over a network. In some embodiments the data and the signature for the data are stored together. For instance, the data and the signature for the data may be combined into a single data object such as a file which is then stored in the data storage system. The data and signature for the data may also be stored as separate data objects and/or in separate systems. Other data, such as metadata, may also be stored with or otherwise in association with the data and the signature for the data. For example, in embodiments where the data is transformed and the transformed data is used to generate the signature, the transformed data may be persistently stored.

As illustrated by the hourglass icon in FIG. 5, at a later time the data and signature may be obtained 508 from the data storage system or systems in which they are stored. It should be noted that while FIG. 5 uses the hourglass to indicate a delay between when the data and signature are stored 506 and when the data and signature are obtained 508, the lack of an hourglass icon between illustrated operations does not necessarily indicate a lack of delay. Generally, the time between the performance of various operations, if any, may vary among the various embodiments and any explicit illustrations of delay are for the purpose of illustration and not necessarily limiting with respect to other operations. While the data is persistently stored (between the time the data is signed and when the data is obtained from persistent storage) various events may occur which potentially affect how a trusted entity may respond to a verification request. For example, a signature may correspond to an identity (e.g., user) that directed a computer system to sign the data. While the data is persistently stored, the identity may be deleted (e.g., an account corresponding to the identity may be deleted, inactivated, or otherwise may change status). As another example, one or more policies based at least in part on the identity of a presenter, presentee, shared secret and/or other factors may change between the time when the data was signed and the data is submitted for verification. Thus, by persistently storing the data, various embodiments of the present disclosure allow for determination of the trusted nature of the party who signed the data the relationship between the party and the party who is relying on the signed data is determined at the time the data is verified, which is at a different time than when the data is signed.

In an embodiment, once the data and signature have been obtained 508 from storage, the data and signature for the data may be provided 510 for verification. Providing 510 the data and signature for verification may be performed in any suitable manner such as by transmitting the data and signature for verification over a network to a trusted entity able to a presentee and/or to a trusted entity. As another example, the data and signature are provided to another component such as a process or cryptographic module (e.g., a cryptographic hardware module) of the same computer system that performs the process 500.

It should also be noted that operations illustrated in FIG. 5 all do not necessarily need to be performed by the same computer system. For example, as noted above, an entity that generates a signature for data and causes the data and signature to be stored may be a different entity than an entity that obtains the data and signature for storage. One computer system may for instance electronically sign the data and cause the data and signature to be stored and another computer system may access the data and signature from storage without any actions on behalf of the computer system that signed the data. Other variations are also considered as being within the scope of the present disclosure, including those discussed above.

Figure 6:
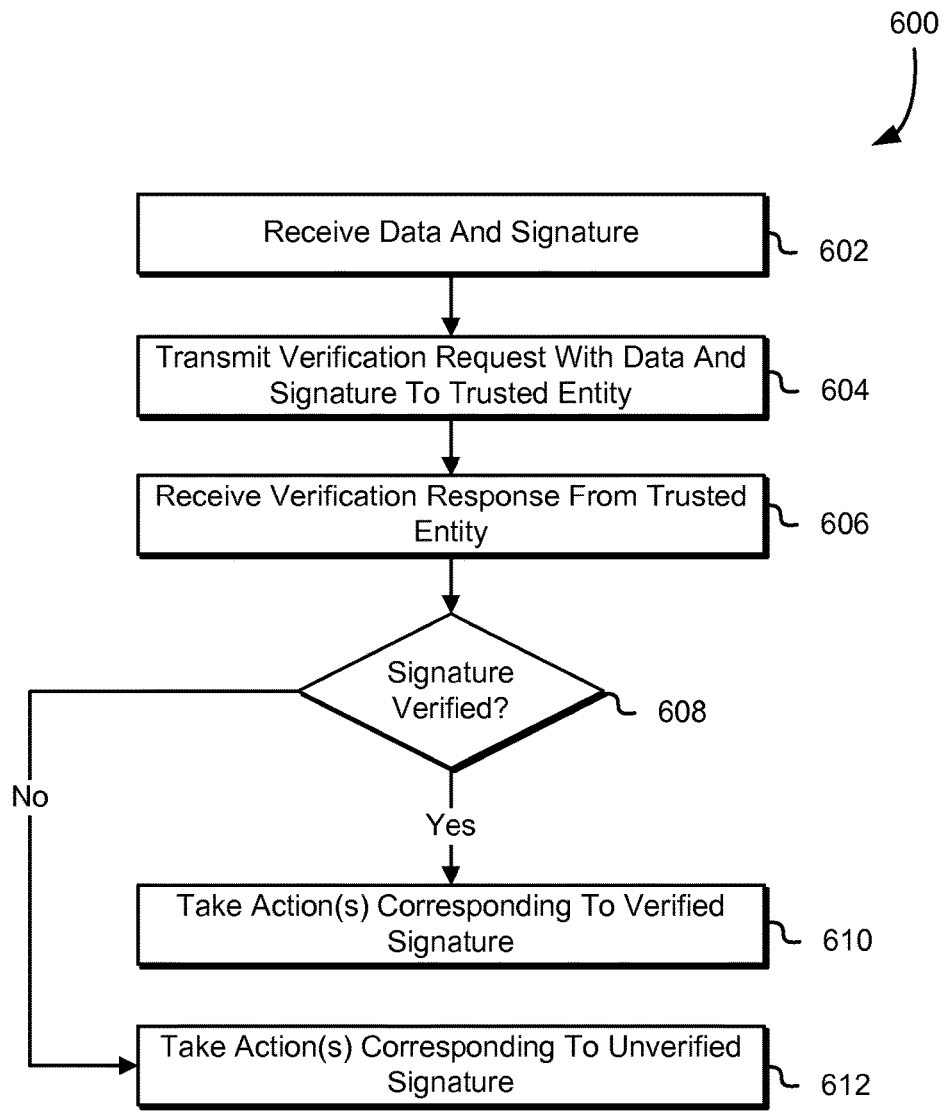
FIG. 6 shows an illustrative example of a process for verifying data in accordance with at least one embodiment.

FIG. 6 shows an illustrated example of a process 600 which may be used to verify the integrity of data in accordance with various embodiments. The process 600 may be performed by any suitable system or component thereof such as a presentee described above. In an embodiment, the process 600 includes receiving 602 data and a signature for the data. The data and the signature for the data may be received any suitable manner such as by accessing the data and signature from local storage and/or from remove storage accessible over a network. As noted above, the data and signature may be stored in the same data storage system or in different data storage systems and receiving 602 the data and signature may be received accordingly. In addition, as noted above the data and signature may be received from data storage through an intermediary, such as a presenter described above.

In an embodiment the process 600 includes transmitting 604 a verification request with the data and signature to a trusted entity. The verification request may be an appropriately configured application programming interface (API) call to the trusted entity which may provide an API for making such calls and other calls. As another example, when the presentee and the trusted entity are implemented by the same computing device, the verification request may be a call to a hardware device or virtual hardware device on which the trusted entity is located/implemented. The verification request may also include metadata associated with the request. The metadata may include information about a context in which the request is submitted. The information about the context may include, for instance, an Internet Protocol (IP) address from which the verification request originates, an identity of the requestor (e.g., an entity on behalf of whom the request is made), authentication information (e.g., an electronic signature) to provide authority to make the request and the like. Generally, the verification request may include additional information, different/independent from the data and the signature of the data, that is used by the verification system to determine how to construct a response. A verification response may then be received 606 from the trusted entity. The verification response may include information indicating whether the data is authentic. In some embodiments, the verification response may have more than two possible responses. For example, as discussed below, verification may be dependent on policy or other factors. Accordingly, a verification response may include information whether verification was successful or unsuccessful, whether verification was performed, any reasons for not performing verification and/or other information that may be useful to a recipient of the verification response.

Upon receipt, the verification response may be analyzed to determine 608 whether the response includes information indicating that signature is verified. If it is determined 608 that the response indicates that signature is verified then the process 600 may include taking 610 one or more actions corresponding to the signature being verified. The one or more actions corresponding to the signature being verified may vary in accordance with the various embodiments. As an example, where one or more actions may include fulfilling a request whose fulfillment is contingent on the signature being verified. Generally, any actions whose performance requires the signature to have been verified may be performed. If it is determined 608 that the signature has not been verified then the process 600 may include taking 612 one or more actions corresponding to the unverified signature. The one or more actions corresponding to the unverified signature may vary in accordance with various embodiments. For example, if one or more actions had been requested and those actions are contingent on the signature having been verified, those actions may not be performed. In other words, taking one or more actions may simply be inaction. In some embodiments if the data and signature were provided as part of a request to perform one or more operations, the one or more actions corresponding to the unverified signature may include denying the request. Generally, any suitable actions corresponding to the unverified signature may be performed.

Figure 7:
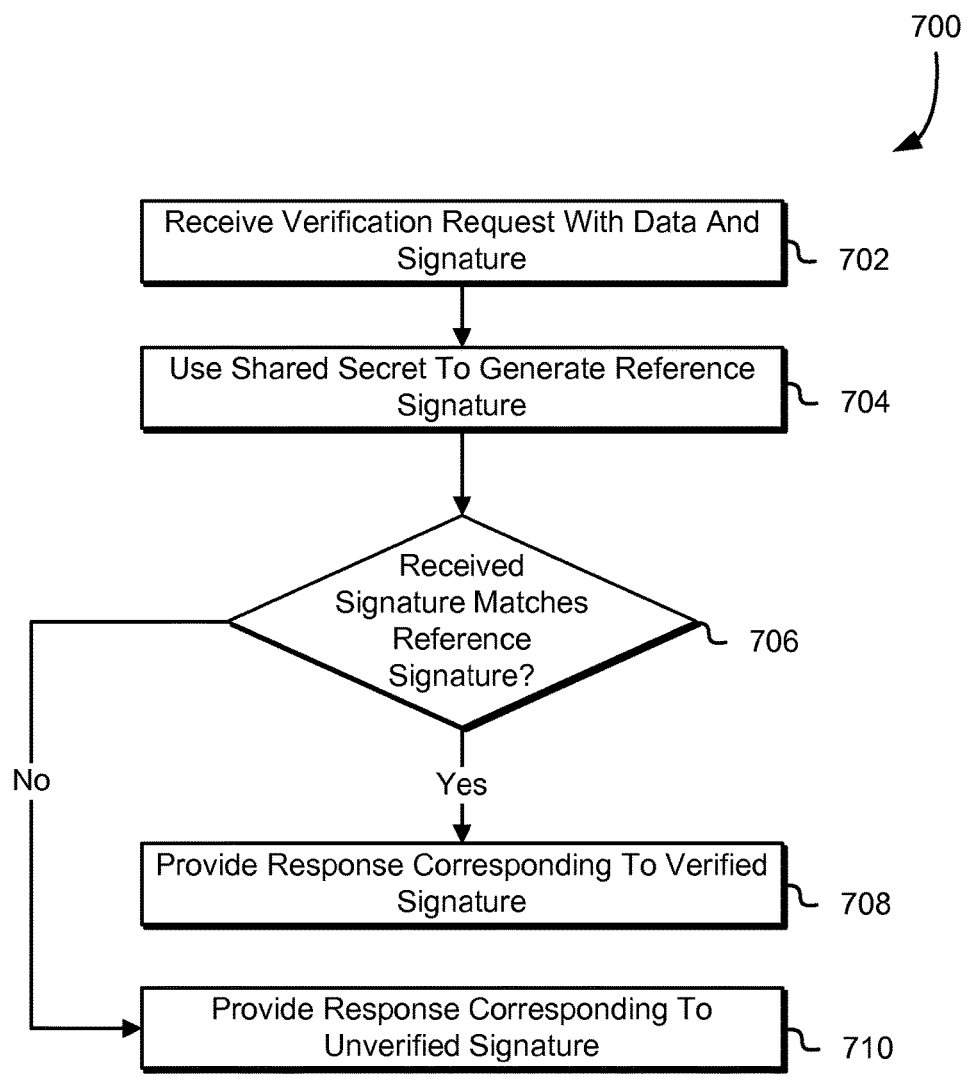
FIG. 7 shows an illustrative example of a process for verifying data in accordance with at least one embodiment.

FIG. 7 shows and illustrative example of a process 700 for verifying an electronic signature in accordance with various embodiments. The process 700 may be performed by any suitable system or component thereof such as a trusted entity described above. As illustrated in FIG. 7, the process 700 includes receiving 702 a verification request with data and a signature (i.e., with signed data). As noted above, the verification request may be received from an entity such as a presentee described above. A secret shared with the entity that originally generated the request may be used to generate 704 a reference signature. For example, the shared secret and the data may be used as inputs to HMAC. A determination may be made 706 whether the received signature matches the reference signature. If it is determined that the received signature matches the reference signature, the process 700 may include providing 708 a response corresponding to the signature being verified. Similarly, if it is determined 706 that the received signature does not match the reference signature a response may be provided 710 where the response corresponds to the signature having not been verified.

As with all processes described herein, numerous variations are considered as being within the scope of the present disclosure. For example, FIG. 7 illustrates two possible responses to a verification request, one response for the signature being verified and another response to the signature being unverified. As noted above, other responses are also possible. For example, in some embodiments, an entity performing the process 700 may include or may communicate with a policy evaluation engine. The process 700 may accordingly include determining whether any policies are applicable and, if so, whether the verification request is in accordance with any applicable policies. The policies may be, as noted above, based at least in part on various factors, such as an identifier of the shared secret, an identity that is purported to have signed the data, an identity of the presentee, an identity of the trusted entity, an identifier of the data or a logical data container in which the data has been stored, one or more services involved in processing the data, other context data and/or other factors. Generally, the policies may be based at least in part on other information about the request, which may be information provided in or otherwise in connection with the request, where the information is different from the data and the signature of the data, such as described above. Accordingly, the responses provided by an entity performing the process 700 may also be dependent on any policy determinations that are made. Generally, any type of response which may be dependent on something other than the signature and the data that may be provided in accordance with various embodiments.

Further, it should be noted that various embodiments of the present disclosure include embodiments where a response may include an attestation to validity of the signature (e.g., an attestation that the signature is valid or the signature is invalid) as a result of the policy evaluation, regardless of whether the signature is valid or not. In this manner, for example, two (or more) different requestors may submit requests to verify the same electronic signature, where the data and signature of the data in the requests are identical. The different requestors may receive different responses with different attestations to validity of the electronic signature as a result of policy applying differently to the different requestors. In addition, a response may include other information about the electronic signature in addition to or instead of an attestation to validity of the electronic signature. The other information may, for instance, identify an entity that generated the electronic signature, identify when the electronic signature was generated, identify one or more policies that may restrict what the data and/or electronic signature may be used for and the like. The type(s) and amount of information provided may also be determined based at least in part on applicable policy.

Other variations of the process 700 considered as being within the scope of the present disclosure include embodiments where other additional operations than those illustrated in FIG. 7 are performed. For example, a trusted entity may have access to numerous keys for numerous various entities that are able to submit requests to the trusted entity. Accordingly, a trusted entity may perform operations such as selecting an appropriate key (shared secret) from multiple stored shared secrets to verify the signature. Selecting the appropriate key may be performed based on information associated with the request (e.g., metadata), such as an identity of the requestor, an identifier of the data, and/or an identifier of the secret. As noted, various events can occur between the time the signature was generated and the time when the verification request is received. As discussed in more detail below, one such event may include publishing of the shared secret. Accordingly, variations of the present disclosure include those where the trusted entity determines, as part of the process 700 or variations thereof, whether a key used to generate the electronic signature has been published, by the trusted entity or otherwise. A response from the trusted entity may indicate that the key was published and/or that the data is not verifiable (e.g., even though the signature is correct, the key was publicly available). Even if the key was published, a response from the verifier may indicate that a signature is invalid when such is the case (e.g., a generated reference signature does not match the provided signature).

Figure 8:
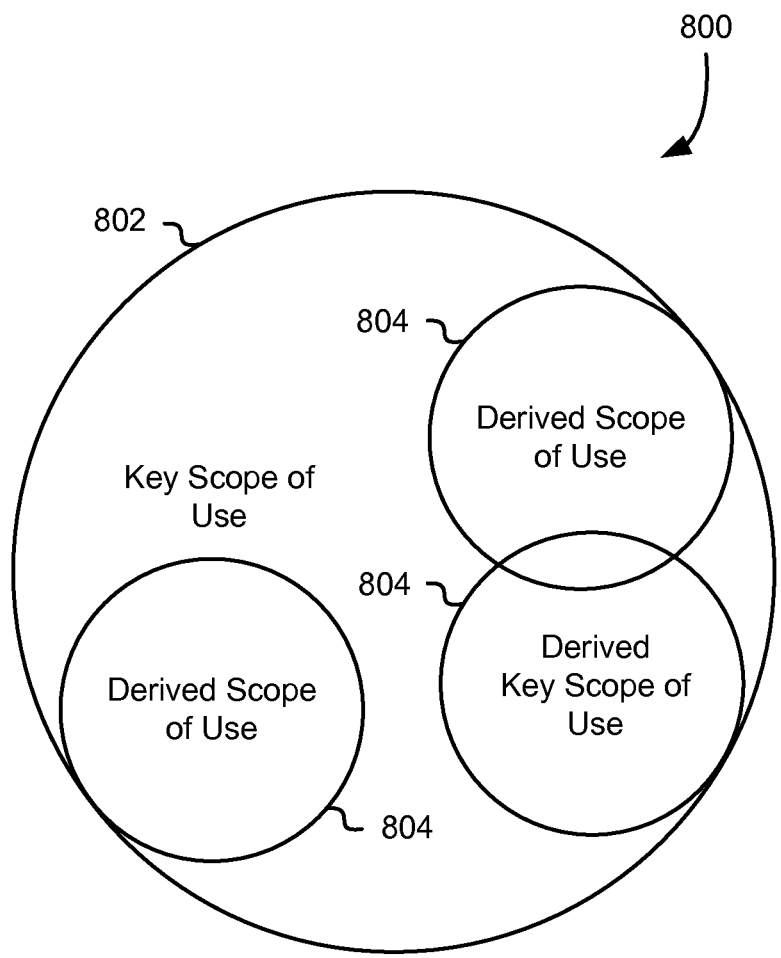
FIG. 8 shows an illustrative diagram showing various scopes of key use in accordance with various embodiments.

Various embodiments of the present disclosure also allow for use of scoped secrets (e.g., scoped keys). FIG. 8 accordingly shows an illustrated example of a Venn diagram 800 illustrating various aspects of the present disclosure. As illustrated in FIG. 8, a cryptographic key may have a corresponding scope of use where the scope of use may be the set of actions for which the key may be used (i.e., actions for which proof of access to the key is required for the actions to be performed). For example, in a distributed computing environment a certain key may be able to be usable to access a set of computing resources such as a set of computing resources associated with an account. Accordingly, the Venn diagram 800 in FIG. 8 shows a first key scope of use 802. The key scope of use 802 may correspond to a particular cryptographic key. Such a key may be used to derive other keys with smaller scopes of use, where smaller is used in a sense that a first set is smaller than a second set if the first set is a proper subset of the second set (i.e., the second set has at least one member that is not a member of the first set).

The derived keys may each correspond to other smaller scopes within the key scope of use 802. Such smaller scopes are illustrated as subsets 804 of the key scope of use 802. Some of the derived key scopes of use 804 may overlap (i.e., have a non-empty intersection) and other sets may be distinct. In addition, some derived scopes may be entirely contained in other key scopes. In some embodiments, keys with key scopes contained in other key scopes can be used to derive additional keys with even smaller key scopes. To derive a key having a smaller scope of use, various techniques may be employed. In some embodiments for example, an HMAC may be computed based at least in part on a key having a corresponding scope of use and information corresponding to a semantic limitation of the scope of use. The information may, for instance, be a string corresponding to the limitation. The HMAC may then be used as a key or used to generate a key that has a smaller scope of use in accordance with the limitation. The information also may be formatted in accordance with a canonical system utilized by various participants.

As an illustrative example of how a key may be derived, a derived key may be based at least in part on an HMAC generated based at least in part on a first key and the string "limitation" where "limitation" may correspond to some limitation, such as a temporal or geographical limitation or the identity of a verifier. Two entities with the first key can both generate the derived key which may be used to verify signatures. Similarly, an entity with access to the first key that receives data and a signature generated based at least in part on the derived key can use the first key to derive the derived key and verify the signature. The entity may be able to determine (e.g., calculate or obtain) the information corresponding to the limitation to derive the derived key. For example, the entity may receive the information with the data and signature. The entity may also perform one or more policy checks with regard to the limitation, such as by determining whether verifying the signature would be in accordance with the limitation.

Figure 9:
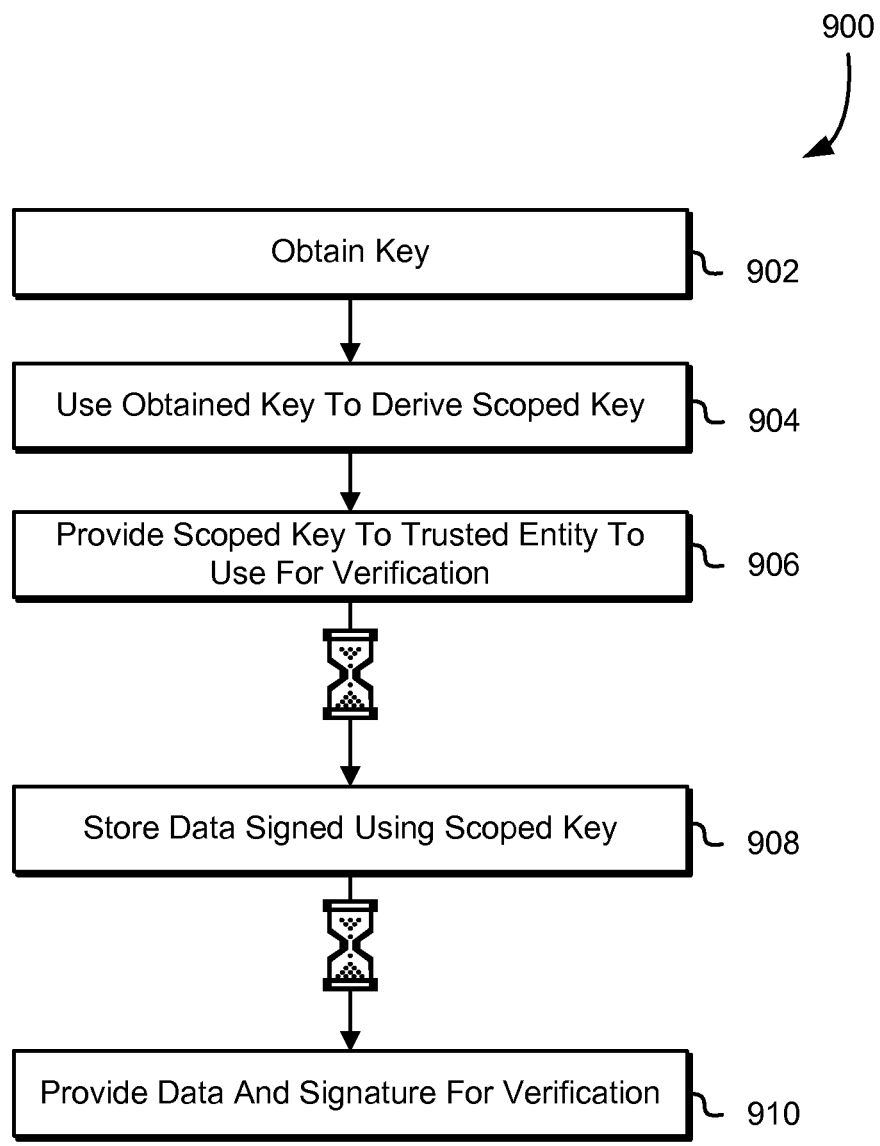
FIG. 9 shows an illustrative example of a process for providing data for verification.

FIG. 9 shows an illustrative example of a process 900 which may be performed to provide verification in accordance with various embodiments. As illustrated in FIG. 9, the process 900 includes obtaining 902 a key. The obtained 902 key may have a corresponding scope of use. The obtained key may then be used 904 to derive a scoped key where the scoped key may be a key that has a smaller scope of use. The scoped key for instance may be usable within a limited time period within a limited geographic region with a limited set of computing resources and/or generally within other limitations that do not affect the key used to derive the scoped key. Once the obtained key has been used 904 to derive the scoped key, the scoped key may then be provided 906 to a trusted entity to use for verification. The scoped key may be transmitted for example over a network to the trusted entity perhaps over a secure communication channel. Although generally the scoped key may be provided in any suitable manner. Further, the scoped key may be kept inaccessible to other trusted entities, thereby enabling only a trusted entity with the scoped key able to use the scoped key to verify data.

After some time, as illustrated by the hourglass icon in FIG. 9, the process 900 may include storing 908 data signed using the scoped key. It should be noted that the operation of storing 908 data may be performed in a different order than illustrated in FIG. 9, such as before the scoped key has been provided to the trusted entity. After the data signed using the scoped key has been stored 908, the process 900 may include providing 910 the data and signature for verification. The data and signature may be provided 910 for example to a presentee or to the trusted entity as appropriate in accordance with the various embodiments in which the process 900 and variations thereof are being performed.

Variations of the process 900 considered as being within the scope of the present disclosure include variations in how the trusted entity obtains the scoped key. As noted above, key derivation may proceed in accordance with a canonical system utilized by various participants. In some embodiments for example, the system performing the process 900 may derive the scoped key and use the derived scope key to sign data which has been persisted for a time. A trusted entity may not actually receive to scoped key from the system performing the process 900 but may be programmed or otherwise configured to derive the scoped key itself. As an illustrative example, a limitation may be a temporal limitation. For instance, a trusted entity may derive a scoped key using a master key and an encoding of the current date or a date on which the data is purported to have been signed. Both the system performing the process 900 and the trusted entity may derive a scoped key from the same shared secret by for instance inputting a time stamp with the shared secret into a one-way function such as HMAC. Other variations are also considered as being within the scope of the present disclosure.

Various embodiments of the present disclosure also allow various enhancements over conventional technique. For example, in some embodiments a trusted entity may be provided or otherwise may obtain the scoped keys. The trusted entity may after some time publish the scoped keys in order to render any signatures generated using the scoped keys unusable for verification of data integrity. As an example, various embodiments of the present disclosure are usable for code signing. A report of a scan of a network may be signed. The report may attest to the network being secure at a particular time. A key used to sign the report may be available to a trusted entity which may, after some time, publish the key such as described above. In this manner, the report is only verifiable using the key until the key is published. As another example, email messages may be signed using a key accessible to a verifier which, after an amount of time (e.g., a week) publishes the key. In this manner, email is verifiable by the key until the key is published.

Figure 10:
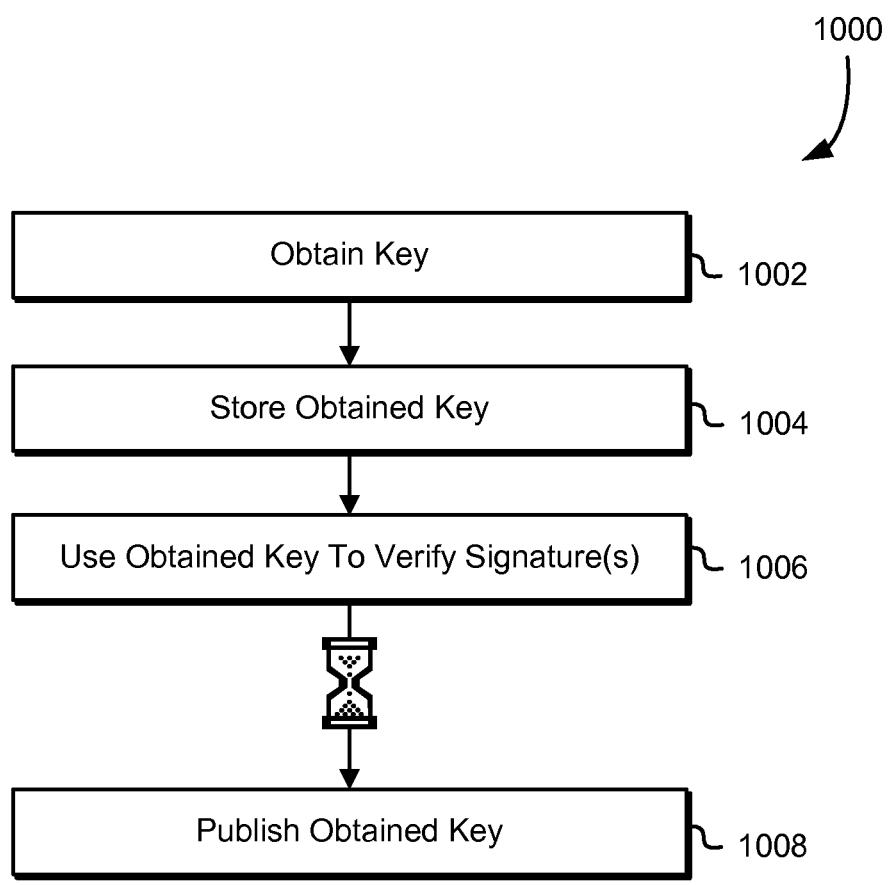
FIG. 10 shows an illustrative example of a process for managing a key used to verify data in accordance with an embodiment.

FIG. 10 shows an illustrative example of a process 1000 which may be used to verify data in accordance with various embodiments. The process 1000 may be performed by any suitable system such as by a trusted entity described above. In an embodiment the process 1000 includes obtaining 1002 a key. The obtained key may for instance be a scoped key such as described above or generally may be any key shared with another entity. The obtained key may then be stored 1004 and accessed from storage as needed to use 1006 the obtained key to verify one or more signatures if any. After some time is illustrated by the hourglass icon the obtained key may then be published 1008. Publishing the obtained key may be performed in any suitable manner. For example, a document encoding the obtained key and/or other metadata such as an identifier for the obtained key may be encoded in an electronic document made publicly accessible such as through a publicly accessible website. In this manner, once the obtained key has been published, any signatures generated using the obtained key are less valuable for data integrity verification since anyone with access to the publicly accessible obtained key can have generated the electronic signature.

As noted above, the techniques described herein provide different technical advantages in a variety of contexts. For instance, applications of the various techniques described are useful for verifying the data in electronic mail systems, databases, system scan reports and/or generally any contexts where the integrity of data is of import. Other contexts in which the techniques described herein and variations thereof are useful include digital rights management (DRM). A media player (e.g., computing device or application operating thereon) may, for instance, be configured (e.g., programmed) to require verification of a signature of a media file by a trusted entity before it will play the media file.

Other enhancements are also considered as being within the scope of the present disclosure. For example, as noted above, keys may be scoped to various limitations. A key may, for instance, be scoped to a particular verifier (e.g., by deriving the key based at least in part on a master secret and an identifier for a verifier). Data may be persistently stored with multiple signatures, each one generated using a different key scoped to a different verifier. Metadata may also be stored with or otherwise in association with the data. The metadata may include information such as which signature corresponds to which verifier having access to an appropriate key for verifying the signature. In this manner, providing the data and a signature to a trusted entity may include using the metadata to select a signature that the trusted entity (verifier) is able to verify. Alternatively, multiple signatures may be provided to a trusted entity. The trusted entity may attempt to verify the multiple signatures until one is found that is verified. Other variations are also considered as being within the scope of the present disclosure.

Figure 11:
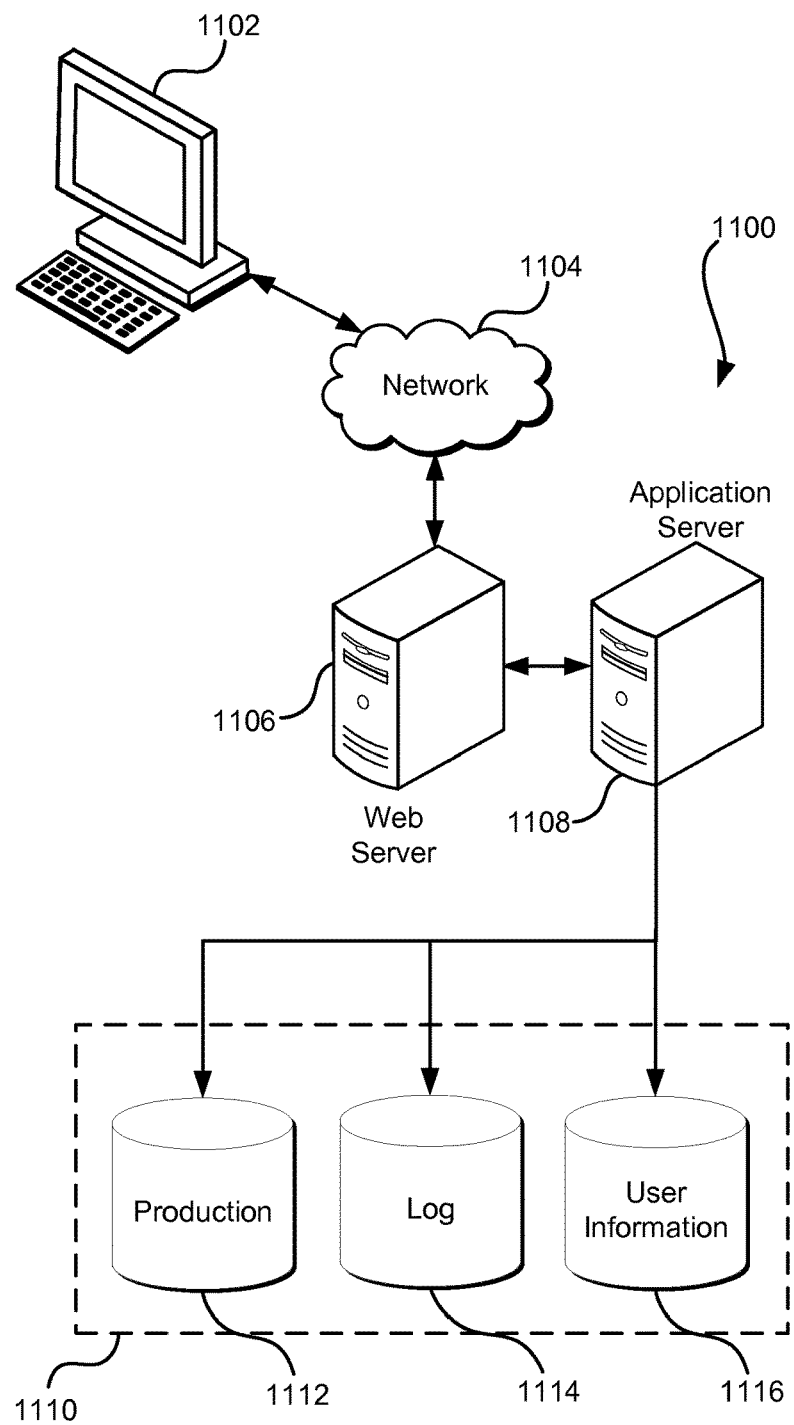
FIG. 11 shows an illustrative example of an environment in which various embodiments may be practiced.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   reading, by one or more computer systems from persistent data storage, data and an electronic signature, the electronic signature having been generated based at least in part on:
      the data; and
      first secret information shared between a first entity and a verification system, the first secret information being:
         derived from second secret information that indicates a scope of use of the first secret information, the scope of use comprising one or more computing operations allowed to be taken using the first secret information; and
         inaccessible to the one or more computer systems;
   submitting, over a network to the verification system, a request to verify the electronic signature, the request including the data and the electronic signature;
   obtaining, from the verification system, a response to the request that includes an indication whether the verification system attests to validity of the electronic signature, the indication being dependent at least in part on whether the electronic signature is verifiable as being within the scope of use indicated by the second secret information; and
   performing the one or more computing operations using the first secret information dependent on the indication.

2. The computer-implemented method of claim 1, wherein reading the data and the electronic signature includes obtaining the data and the electronic signature from another computer system different from the one or more computer systems.

3. The computer-implemented method of claim 2, wherein the electronic signature was generated by the other computer system.

4. The computer-implemented method of claim 1, wherein the electronic signature was generated using one or more symmetric cryptographic primitives.

5. The computer-implemented method of claim 1, wherein:
   the persistent data storage is a component of a database; and
   reading the data includes querying the database.

6. The computer-implemented method of claim 1, wherein:
   the data and electronic signature includes metadata with information associated with at least one of the data or an entity requesting to verify the electronic signature; and
   the verification system is configured to determine, based at least in part on the metadata, how to construct the response.

7. The computer-implemented method of claim 1, wherein the request is a first request:
   the response to the first request indicates that the verification system attests to validity of the electronic signature; and
   the method further comprises:
      transmitting, over the network, a second request to verify the electronic signature;
      obtaining, from the verification system, a response to the second request that lacks an attestation of validity of the electronic signature; and
      performing one or more second computing operations, different from the one or more computing operations, as a result of the response to the second request lacking the attestation.

8. The computer-implemented method of claim 1, wherein the response obtained includes information usable to determine at least one of:
   an identity of a signor that generated the electronic signature, or
   one or more restraints on use of the data.

9. The computer-implemented method of claim 1, wherein:
   the response to the request includes information about a context of generation of the electronic signature; and
   the one or more computing operations are dependent on the information about the context.

10. The computer-implemented method of claim 1, wherein:
the network is a virtual network implemented by a hypervisor; and
the verification system is implemented in a virtual machine running on said hypervisor.

11. A system, comprising:
memory to store executable instructions that, as a result of being executed by one or more processors, cause the system to:
obtain secret information and one or more conditions comprising one or more actions that are allowed to be taken using the secret information;
obtain, from a first requestor, a first request to verify an electronic signature that was generated based at least in part on the secret information;
provide a first response to the first request with a first attestation about whether the electronic signature indicates authenticity of data, the first request including information indicative of satisfying the one or more conditions;
obtain, from a second requestor, a second request to verify the electronic signature; and
provide a second response to the second request with a second attestation about whether the electronic signature indicates authenticity of the data, the second attestation providing a different indication of authenticity of the data than the first attestation.

12. The system of claim 11, wherein the first response and the second response have different amounts of information about the electronic signature as a result of one or more policies.

13. The system of claim 11, wherein the executable instructions further cause the system to make the secret information publicly available after an amount of time.

14. The system of claim 13, wherein:
the executable instructions further cause the system to implement a hypervisor and a client domain of the hypervisor; and
at least one of the first request or second request originates from the client domain of the hypervisor.

15. The system of claim 11, wherein the electronic signature was generated by the first requestor or second requestor.

16. The system of claim 11, wherein the executable instructions are configured such that an occurrence of one or more specified events between generation of the electronic signature and receipt of the first request causes the first response to lack an indication that the electronic signature is valid.

17. The system of claim 11, wherein:
the first request includes an identifier of the secret information; and
the executable instructions further cause the system to select the secret information from other secret information based at least in part on the identifier.

18. The system of claim 11, wherein at least one of the first response and second response indicates that the electronic signature is valid and another of the first response and second response indicates that the electronic signature is invalid.

19. The system of claim 11, wherein:
other secret information, inaccessible to the system, is usable for a set of uses; and
the secret information obtained is cryptographically derived from the other secret information such that the secret information is unusable for a first proper subset of the set of uses but usable for a second proper subset of the set of uses.

20. The system of claim 11, wherein:
the executable instructions further cause the system to provide an application programming interface configured to obtain application programming interface requests to configure parameters for responding to requests to verify electronic signatures; and
the second attestation being different from the first attestation is a result of information obtained through the application programming interface.

21. The system of claim 11, wherein:
the system is operated by a service provider; and
the first requestor and second requestor correspond to different customers of the service provider.

22. A non-transitory computer-readable storage medium having stored thereon executable instructions that, as a result of execution by one or more processors of a computer system, cause the computer system to:
obtain, from persistent storage, data and an electronic signature generated based at least in part on: data and first secret information, the first secret information being:
accessible to a verification system;
inaccessible to the computer system; and
derived from second secret information that indicates a scope of use of the first secret information, the scope of use comprising a set of computing resources that are allowed to be accessed using the first secret information;
transmit, over a network to the verification system, a request to verify the electronic signature, the request including the data and the electronic signature; and
take one or more actions in dependence on a response obtained from the verification system, the response including an indication whether the verification system attests to validity of the electronic signature in accordance with the scope of use indicated by the second secret information, the one or more actions including providing access to the set of computing resources.

23. The non-transitory computer-readable storage medium of claim 22, wherein the first secret information is accessible to an entity that generated the electronic signature, the entity being different from the verification system.

24. The non-transitory computer-readable storage medium of claim 23, wherein the entity that generated the electronic signature and computer system are different entities.

25. The non-transitory computer-readable storage medium of claim 24, wherein:
the executable instructions further cause the computer system to implement a hypervisor; and
the verification system is implemented as part of a process of the hypervisor.

26. The non-transitory computer-readable storage medium of claim 22, wherein the data is an electronic mail message.

27. The non-transitory computer-readable storage medium of claim 22, wherein:
the verification system is configured to publish the first secret information; and
the response is further dependent on whether the verification system has published the secret information.

28. The non-transitory computer-readable storage medium of claim 22, wherein the executable instructions that cause the computer system to obtain the persistently stored data include instructions that cause the computer system to read the persistently stored data from a database that persistently stores the data.

29. The non-transitory computer-readable storage medium of claim 22, wherein the executable instructions that cause the computer system to obtain the persistently stored data include instructions that cause the computer system to obtain the persistently stored data from a third party that persistently stores the data.

\* \* \* \* \*